(12) United States Patent
Jeong et al.

(10) Patent No.: US 8,385,562 B2
(45) Date of Patent: Feb. 26, 2013

(54) SOUND SOURCE SIGNAL FILTERING METHOD BASED ON CALCULATED DISTANCES BETWEEN MICROPHONE AND SOUND SOURCE

(75) Inventors: Jae-hoon Jeong, Yongin-si (KR);
Kwang-cheol Oh, Yongin-si (KR);
Kyu-hong Kim, Yongin-si (KR);
So-young Jeong, Seoul (KR)

(73) Assignee: Samsung Electronics Co., Ltd, Suwon-Si (KR)

(*) Notice: Subject to any disclaimer, the term of this patent is extended or adjusted under 35 U.S.C. 154(b) by 1052 days.

(21) Appl. No.: 12/149,521

(22) Filed: May 2, 2008

(65) Prior Publication Data
US 2009/0141908 A1    Jun. 4, 2009

(30) Foreign Application Priority Data
Dec. 3, 2007    (KR) .......................... 10-2007-0124385

(51) Int. Cl.
*H04R 3/00*    (2006.01)
(52) U.S. Cl. ........................................... 381/92
(58) Field of Classification Search ............... 381/92
See application file for complete search history.

(56) References Cited

U.S. PATENT DOCUMENTS

| | | | | |
|---|---|---|---|---|
| 7,710,826 B2 * | 5/2010 | Jeong et al. | ................... | 367/124 |
| 8,005,237 B2 * | 8/2011 | Tashev et al. | ................... | 381/92 |

FOREIGN PATENT DOCUMENTS

| | | |
|---|---|---|
| JP | 2001-309483 | 11/2001 |
| KR | 10-2004-0079085 | 9/2004 |
| KR | 10-2006-0042966 | 5/2006 |
| KR | 10-0736434 | 7/2007 |

OTHER PUBLICATIONS

Korean Notice of Allowance for related Korean Patent Application No. 10-2007-0124385, mailed on Nov. 22, 2012.

* cited by examiner

*Primary Examiner* — Howard Weiss
(74) *Attorney, Agent, or Firm* — Staas & Halsey LLP

(57) ABSTRACT

Provided is a sound source signal filtering method and apparatus. The sound source signal filtering method includes: generating two or more microphone output signals by combining sound source signals input through a plurality of microphones; calculating distances between the microphones and a sound source from which the sound source signals are emitted by using distance relationships according to frequencies of the sound source signals extracted from the generated microphone output signals; and filtering the sound source signals to obtain one or more sound source signals corresponding to a predetermined distance by using the calculated distances. Accordingly, it is possible to obtain only sound source signals emitted from a sound source at a particular distance from the microphone array among a plurality of sound source signals input through the microphone array.

6 Claims, 10 Drawing Sheets

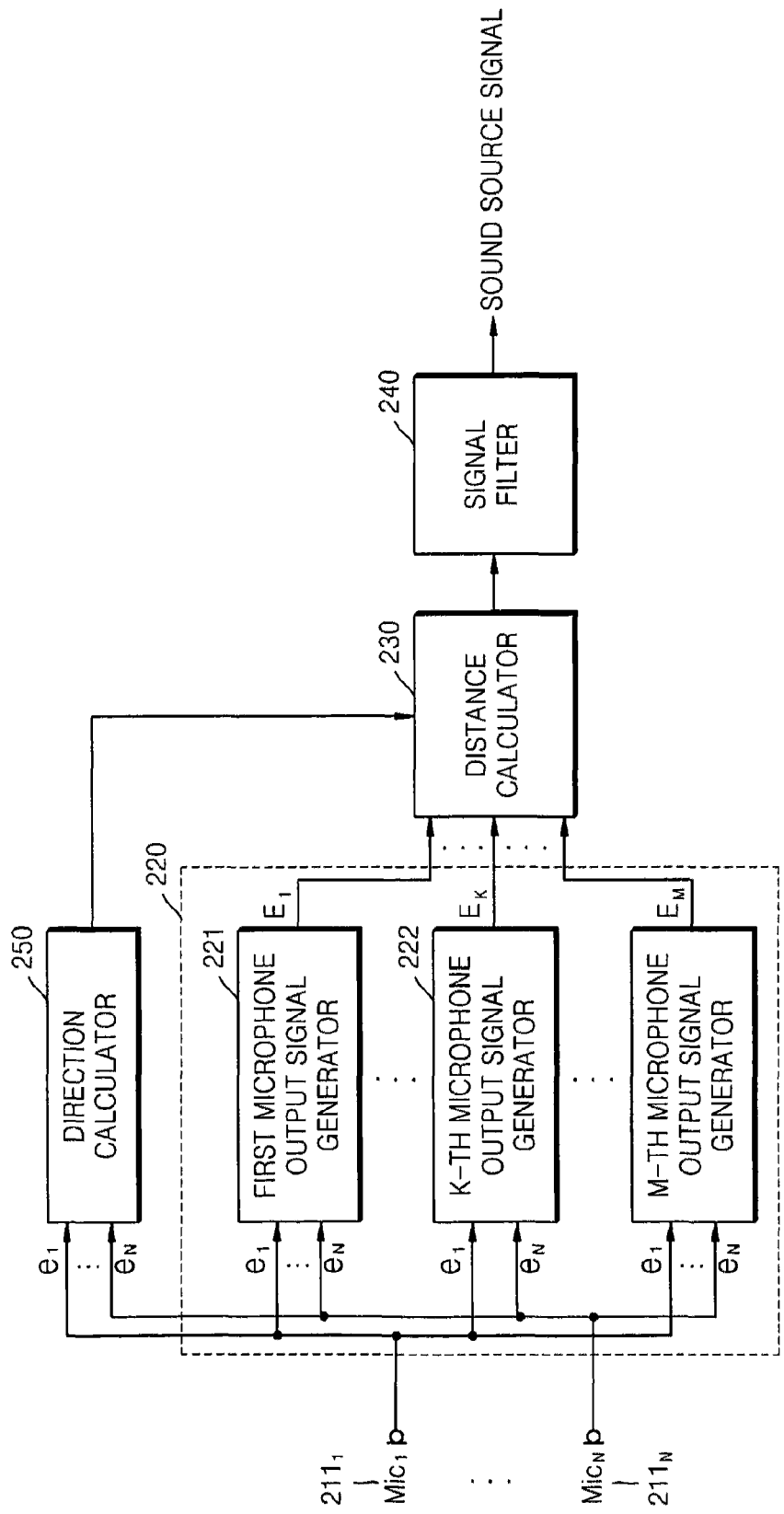

SOUND SOURCE SIGNAL FILTERING METHOD BASED ON CALCULATED DISTANCES BETWEEN MICROPHONE AND SOUND SOURCE

CROSS-REFERENCE TO RELATED PATENT APPLICATION

This application claims the benefit of Korean Patent Application No. 10-2007-0124385, filed on Dec. 3, 2007, in the Korean Intellectual Property Office, the disclosure of which is incorporated herein in its entirety by reference.

BACKGROUND

1. Field

One or more embodiments of the present invention relates to a method of and apparatus for filtering sound source signals in a sound acquisition device including a microphone array, and more particularly, to a method of and apparatus for filtering a plurality of sound source signals input through a microphone array to obtain particular sound source signals.

2. Description of the Related Art

Nowadays, recording of an external voice, recording of a video file, or speaking on the phone can be easily performed by using a portable digital device. In order to record sound source signals, microphones are used for various digital devices such as mobile phones and consumer electronics. In addition, a microphone array including a plurality of microphones is generally used to easily process an acquired sound source signal.

The microphone array can obtain additional characteristics on directivity such as a direction or a position of a sound source signal to be acquired in addition to the sound source signal itself by combining a plurality of microphones. The directivity represents increases in sensitivity of sound source signals emitted from a sound source in a particular direction by using differences in times the sound source signals arrive at each microphone. Therefore, by acquiring sound source signals through a use of the microphone array, the sound signal input in a particular direction can either be emphasized or suppressed.

Unless recording is performed in a soundproof studio, recording a sound source signal or receiving a sound source signal by using a general digital device is more often performed in an environment with a presence of noise and interferences rather than in a quiet environment free from noise. Therefore, in order to extract a particular sound source signal for a user from mixed sound source signals via the division of each sound source signal, or to remove a sound source signal corresponding to unnecessary interference noise, various sound source signal processing technologies have been developed.

SUMMARY OF THE INVENTION

One or more embodiments of the present invention provides a sound source signal filtering method and apparatus capable of solving a problem in which acquiring only sound source signals emitted from a sound source at a particular distance away from a microphone array among a plurality of sound source signals input through the microphone array cannot be performed. The present invention also provides a sound source signal filtering method and apparatus capable of overcoming a constraint in which sound source signals emitted from a sound source in the same direction cannot be clearly identified.

According to an aspect of the present invention, there is provided a sound source signal filtering method including: generating two or more microphone output signals by combining sound source signals input through a plurality of microphones; calculating distances between the microphones and a sound source from which the sound source signals are emitted by using distance relationships according to frequencies of the sound source signals extracted from the generated microphone output signals; and filtering the sound source signals to obtain one or more sound source signals corresponding to a predetermined distance by using the calculated distances.

According to another aspect of the present invention, there is provided a recording medium that can be read by a computer that records the program for executing the sound source signal filtering method on the computer.

According to another aspect of the present invention, there is provided a sound source signal filtering apparatus including: a microphone output signal generator generating two or more microphone output signals by combining sound source signals input through a plurality of microphones; a distance calculator calculating distances from the microphones to a sound source from which the sound source signals are emitted by using distance relationships according to frequencies of the sound source signals of the generated microphone output signals; and a signal filter filtering the sound source signals to obtain one or more sound source signals corresponding to a predetermined distance by using the calculated distances.

BRIEF DESCRIPTION OF THE DRAWINGS

The above and other features and advantages of the present invention will become more apparent by describing in detail exemplary embodiments thereof with reference to the attached drawings in which:

FIG. 2 is a block diagram illustrating a sound source signal filtering apparatus based on sound source distances, according to another embodiment of the present invention;

DETAILED DESCRIPTION OF THE INVENTION

Hereinafter, exemplary embodiments of the present invention will be described in detail with reference to the attached drawings. In the description, a sound source is used as a term referring to a source from which a sound is emitted, and a sound pressure refers to a force exerted by acoustic energy through a use of a physical quantity. In addition, according to the exemplary embodiments of the present invention, a sound source distance is used to filter sound source signals that are input through a microphone array to obtain a particular sound source signal. Here, the term sound source distance refers to a distance from a sound source acquisition device (a microphone or a device including a microphone) to the sound source.

Figure 1:
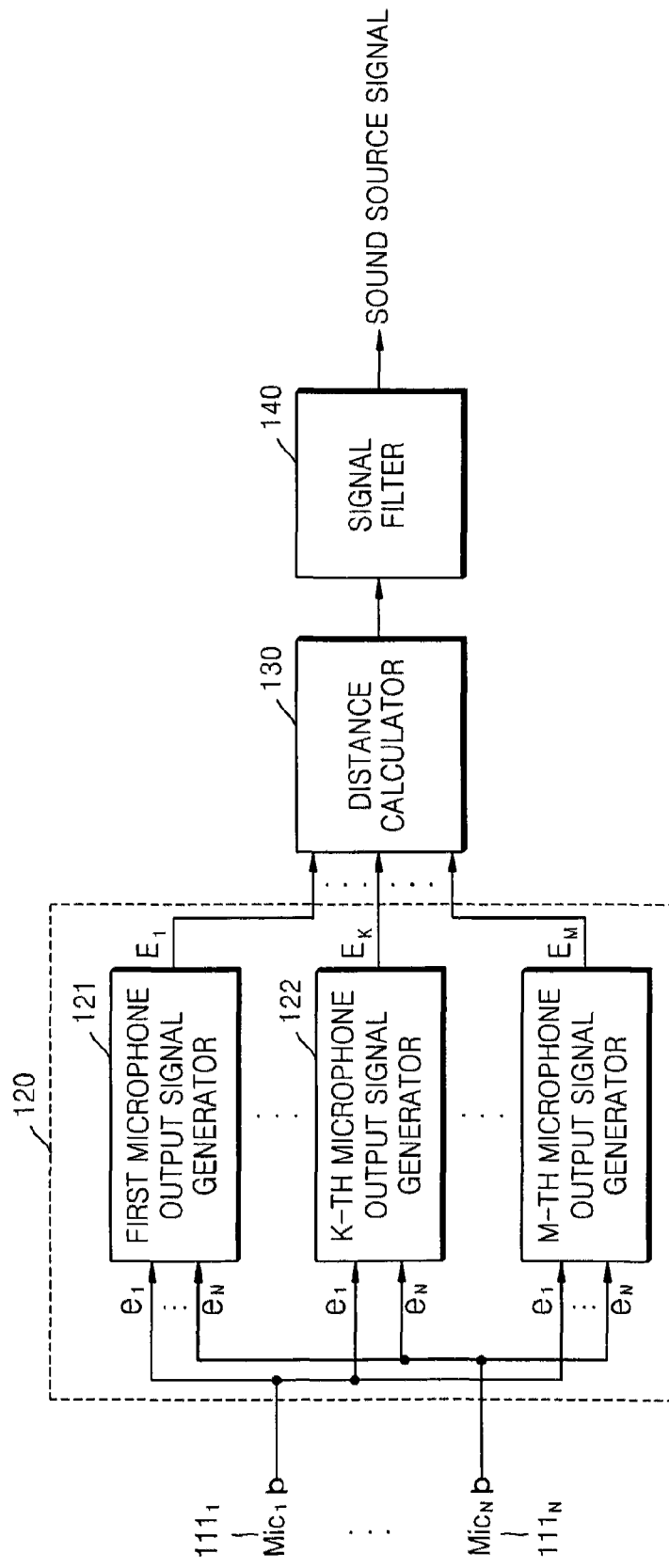
FIG. 1 is a block diagram illustrating a sound source signal filtering apparatus based on sound source distances, according to an embodiment of the present invention.

FIG. 1 is a block diagram illustrating a sound source signal filtering apparatus based on a sound source distance according to an embodiment of the present invention. The sound source signal filtering apparatus includes a plurality of microphones $111_1$ to $111_N$, a microphone output signal generator 120, a distance calculator 130, and a signal filter 140.

The plurality of microphones $111_1$ to $111_N$ receives sound source signals from various sound sources near the sound source signal filtering apparatus. The plurality of microphones $111_1$ to $111_N$ may be implemented as a microphone array, which is a structure for convenient attainment of positional information on sound sources such as their direction or their distance away from the sound source. In FIG. 1, N sound source signals $e_1$ to $e_N$ are received through a microphone array including N microphones $Mic_1$ to $Mic_N$.

The microphone output signal generator 120 generates two or more microphone output signals by combining the sound source signals input through the plurality of the microphones $111_1$ to $111_N$. The microphone output signal generator 120 includes M microphone output signal generators to generate M microphone output signals $E_1, \ldots, E_K, \ldots, E_M$. For example, in FIG. 1, the first microphone output signal generator 121 receives N sound source signals $e_1$ to $e_N$ and generates the microphone output signal $E_1$ by combining the received N sound source signals $e_1$ to $e_N$. Similarly, the K-th microphone output signal generator 122 receives N sound source signals $e_1$ to $e_N$ and generates the microphone output signal $E_K$ by combining the received N sound source signals $e_1$ to $e_N$. Now, operations of generating the microphone output signals are described in detail with reference to FIGS. 4A and 4B.

Figure 4A:
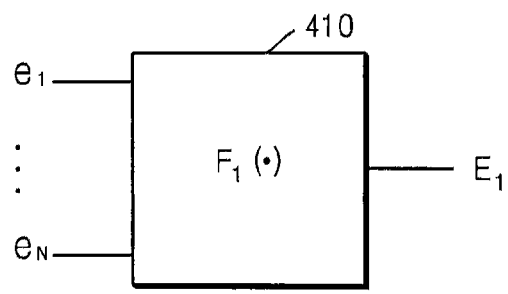
FIGS. 4A and 4B are diagrams for explaining a process of generating microphone output signals performed by a sound source signal filtering apparatus, according to an embodiment of the present invention.
Figure 4B:
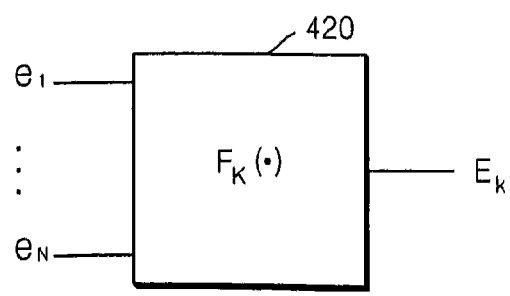

FIGS. 4A and 4B are diagrams for explaining a process of generating a microphone output signal performed by the sound source signal filtering apparatus, according to an embodiment of the present invention. FIGS. 4A and 4B show the first microphone output signal generator 410 and the K-th microphone output signal generator 420. According to exemplary embodiments of the present invention, operations of generating a plurality of (for example, N that is equal to the number of microphone output signal generators) microphone output signals using a plurality of (for example, N) microphone output signal generators are described. However, in FIGS. 4A and 4B, the two microphone output signal generators are illustrated for the convenience of description.

The two microphone output signal generators 410 and 420 generate the microphone output signals $E_1$ and $E_K$ by combining the N sound source signals $e_1$ to $e_N$ using predetermined transformation functions. The transformation functions illustrated in FIGS. 4A and 4B are $F_1(\bullet)$ and $F_K(\bullet)$, respectively. Here, the predetermined transformation function receives a plurality of sound source signals and outputs the microphone output signal through various combination methods such as adding the sound source signals or subtracting some sound source signals from the sound source signals. The combination methods can be applied to any transformation function such as linear and non-linear transformation functions, and this can be easily construed by those skilled in the art.

The M microphone output signals $E_1, \ldots, E_K, \ldots, E_M$ generated by the microphone output signal generators 410 and 420 must have different sound attenuation rates according to their distance. The sound attenuation rate of a signal according to its distance represents a rate of decrease in amplitude or acoustic energy as a sound (referred to as a sound wave) is transmitted from a sound source. The sound attenuation rate is derived from a wave equation. In general, the amplitude decreases according to a distance of a sound from a sound source, so that the sound attenuation ratio is inversely proportional to a distance from a sound source.

The fact that the M generated microphone output signals have different sound attenuation rates according to their distances from each other means that the M transformation functions are different from each other. Specifically, methods of combining the N sound source signals $e_1$ to $e_N$ of the transformation functions such as the $F_1(\bullet)$ and $F_K(\bullet)$ are different from each other. Therefore, as long as the aforementioned condition in which the sound attenuation rates through the transformation functions being different from each other is satisfied, the methods of combining the input sound source signals of the M transformation functions can be designed freely. An example of designing the transformation functions is described with reference to FIGS. 5A and 5B.

Figure 5A:
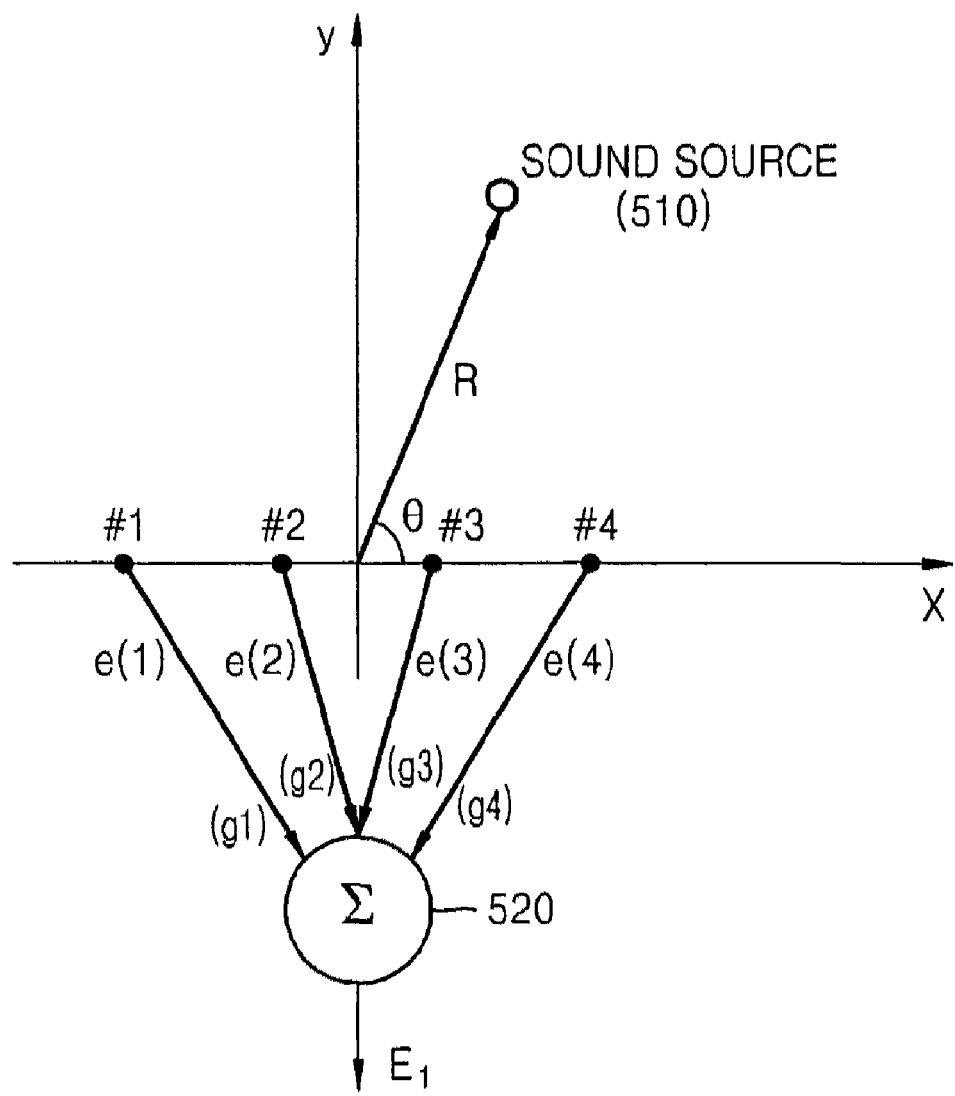
FIGS. 5A and 5B are diagrams illustrating a process of generating the microphone output signals of FIGS. 4A and 4B.
Figure 5B:
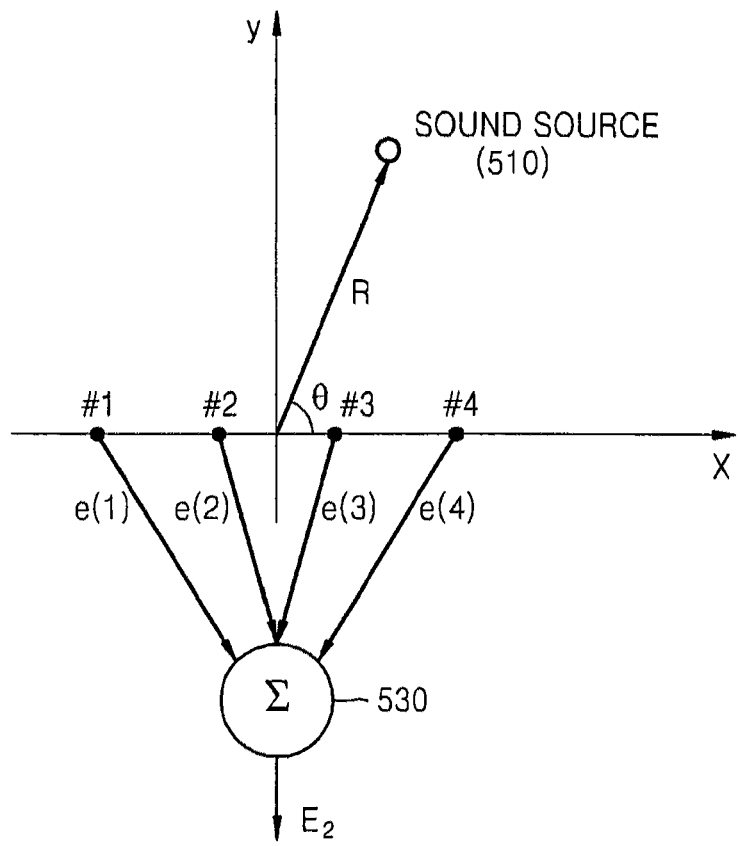

FIGS. 5A and 5B are diagrams illustrating a process of generating the microphone output signals of FIGS. 4A and 4B. FIGS. 5A and 5B further illustrate two microphone output signal generators corresponding to the first microphone output signal generator 410 of FIG. 4A and the K-th microphone output signal generator 420 of FIG. 4B, respectively. According to the current embodiment of the present invention, it is assumed that the two microphone output signal generators and a microphone array including four microphones are used.

In FIG. 5A, the microphone output signal generator combines four sound source signals e(1), e(2), e(3), and e(4) emitted from a sound source 510 by using a second-order gradient microphone structure. The second-order gradient microphone (referred to as a differential microphone) structure is a microphone structure that combines sound source signals by grouping the four microphones into pairs. Here, it will be understood that a first-order or higher-order gradient microphone may be used instead of the second-order gradient microphone according to the number of microphones receiving sound source signals.

Transforming the four sound source signals using the second-order gradient microphone is performed by a linear transformation matrix as represented in Equation 1.

$$F_1 = \begin{bmatrix} 1 & 0 & 0 & 0 \\ 0 & -1 & 0 & 0 \\ 0 & 0 & -1 & 0 \\ 0 & 0 & 0 & 1 \end{bmatrix} \quad \text{[Equation 1]}$$

Here, when each element in Equation 1 is represented as $g_{ij}$ (i denotes a row and j denotes a column), the transformation function of the second-order gradient microphone is represented as a linear transformation matrix having the diagonal elements $[g_{11}, g_{22}, g_{33}, g_{44}]$ equal to $[1, -1, -1, 1]$ with the remaining elements equal to 0. Specifically, multiplications of the sound source signals e(1), e(2), e(3), and e(4) illustrated in FIG. 5A and g(1), g(2), g(3), and g(4), respectively, are performed, and the multiplied values are added through an adder 520 to be output as a single microphone output signal $E_1$.

When it is assumed that the microphone array exists on the x-axis of coordinates illustrated in FIG. 5A, an angle between the x-axis and the sound source 510 is θ, and a distance from the origin to the sound source 510 is R, the microphone output signal is calculated by using Equation 2.

$$e = A \frac{\sin\frac{2\pi}{\lambda}(c \cdot t - r)}{r}$$ [Equation 2]

$$r(j) = \sqrt{(x(j) - R \cdot \cos\theta)^2 + (y(j) - R \cdot \sin\theta)^2},$$

where, $j = 1, 2, 3, 4$.

$$e(t, \lambda, j) = A \frac{\sin\left[\omega \cdot t - \frac{2\pi}{\lambda} \cdot r(j)\right]}{r(j)},$$

where, $\omega = \frac{2\pi}{\lambda} \cdot c$ $$E_g(t, \lambda) = A \cdot \sum_{j=1}^{4} g(j) \left[ \frac{\sin\left[\omega \cdot t - \frac{2\pi}{\lambda} \cdot r(j)\right]}{r(j)} \right]$$

$$= A \cdot \sum_{j=1}^{4} g(j) \frac{\cos\left[\frac{2\pi}{\lambda} \cdot r(j)\right]}{r(j)} \sin\omega \cdot t - A \cdot \sum_{j=1}^{4} g(j) \frac{\sin\left[\frac{2\pi}{\lambda} \cdot r(j)\right]}{r(j)} \cos\omega \cdot t$$

$$|E_1(t, \lambda)| = A \cdot \sqrt{\left(\sum_{j=1}^{4} g(j) \frac{\cos\psi}{r(j)}\right)^2 + \left(\sum_{j=1}^{4} g(j) \frac{\sin\psi}{r(j)}\right)^2},$$

where, $\psi = \frac{2\pi}{\lambda} \cdot r(j)$.

Here, e denotes an input signal, A denotes an amplitude, λ denotes a wavelength, c denotes a speed of a sound wave in air having a value of 340 m/sec, and $E_1$ denotes the microphone output signal.

Next, the second microphone output signal generator illustrated in FIG. 5B is described. The microphone output signal generator illustrated in FIG. 5B combines the four sound source signals e(1), e(2), e(3), and e(4) emitted from the sound source 510 by using a sum of omni microphone structure. The sum of omni microphone structure is a microphone structure for simply combining the sound source signals acquired through four omni microphones. Here, the omni microphone refers to a non-directional microphone having a uniform sensitivity to all directions around the microphone. Similarly, the microphone output signal generator illustrated in FIG. 5B may use any type of microphone combination in addition to the sum of omni microphone structure.

Transforming the four sound signals using the sum of omni microphone structure is performed by a linear transformation matrix as represented in Equation 3.

$$F_2 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$ [Equation 3]

Similarly to Equation 1, each element of Equation 3 is represented as $g_{ij}$ (i denotes a row and j denotes a column), the transformation function of the omni microphone is represented as a linear transformation matrix having diagonal elements $[g_{11}, g_{22}, g_{33}, g_{44}]$ equal to $[1, 1, 1, 1]$ with the remaining elements of 0. Specifically, without a particular transformation, the sound source signals e(1), e(2), e(3), and e(4) illustrated in FIG. 5B are added through an adder 530 to be output as a single microphone output signal $E_2$.

When it is assumed that the microphone array exists on the x-axis of coordinates illustrated in FIG. 5B, an angle between the x-axis and the sound source 510 is θ, and a distance from the origin to the sound source 510 is R, the microphone output signal is calculated by using Equation 4.

$$e = A \frac{\sin\frac{2\pi}{\lambda}(c \cdot t - r)}{r}$$ [Equation 4]

$$r(j) = \sqrt{(x(j) - R \cdot \cos\theta)^2 + (y(j) - R \cdot \sin\theta)^2},$$

where, $j = 1, 2, 3, 4$.

$$e(t, \lambda, j) = A \frac{\sin\left[\omega \cdot t - \frac{2\pi}{\lambda} \cdot r(j)\right]}{r(j)},$$

where, $\omega = \frac{2\pi}{\lambda} \cdot c$ $$E_o(t, \lambda) = A \cdot \sum_{j=1}^{4} \left[ \frac{\sin\left[\omega \cdot t - \frac{2\pi}{\lambda} \cdot r(j)\right]}{r(j)} \right]$$

$$= A \cdot \sum_{j=1}^{4} \frac{\cos\left[\frac{2\pi}{\lambda} \cdot r(j)\right]}{r(j)} \sin\omega \cdot t - A \cdot \sum_{j=1}^{4} \frac{\sin\left[\frac{2\pi}{\lambda} \cdot r(j)\right]}{r(j)} \cos\omega \cdot t$$

$$|E_2(t, \lambda)| = A \cdot \sqrt{\left(\sum_{j=1}^{4} \frac{\cos\psi}{r(j)}\right)^2 + \left(\sum_{j=1}^{4} \frac{\sin\psi}{r(j)}\right)^2},$$

where, $\psi = \frac{2\pi}{\lambda} \cdot r(j)$.

Similarly to Equation 2, e denotes an input signal, A denotes an amplitude, λ denotes a wavelength, c denotes a speed of a sound wave in air having a value of 340 m/sec, and $E_1$ denotes the microphone output signal.

When the microphone output signals $E_1$ and $E_2$ are compared with each other by using Equations 2 and 4, the microphone output signal $E_1$ using the second-order gradient microphone structure further includes a sign component g(j) as compared with the microphone output signal $E_2$.

The process of generating the microphone output signals by combining the sound source signals performed by the microphone output signal generator 120 illustrated in FIG. 1 is described above. In addition, the transformation functions of the microphone output signal generator 120 are described above by using the second-order gradient microphone structure and the sum of omni microphone structure. A method of configuring the microphone output signal generator 120 is not limited to the aforementioned embodiments, and it will be understood by those skilled in the art that various methods of designing the microphone output signal generator 120 and the transformation functions of the microphone output signal generator 120 may be used according to the number of the plurality of the microphones $111_1$ to $111_N$ or the method of combining the sound source signals.

Next, the distance calculator 130 calculates distances from the microphones to the sound source from which the sound source signals are emitted by using distance relationships according to frequencies of the sound source signals of the microphone output signals $E_1, \ldots, E_K, \ldots, E_M$ generated by the microphone output signal generator 120. To do this, the distance calculator 130 operates the microphone output signals $E_1, \ldots, E_K, \ldots, E_M$ by using distance functions. Here, the distance function refers to a function for independently calculating a distance from a magnitude of the sound source signal by receiving the microphone output signals generated by the microphone output signal generator 120. The magnitude of the sound source signal refers to a strength of the sound source signal such as an amplitude of a sound wave. Specifically, the distance function calculates a sound source distance irrespective of the magnitude of the sound source signal among various factors for determining the microphone output signals generated by the microphone output signal generator 120. Now, a calculation process of the sound source distance using the distance function with the distance calculator 130 is described in detail with reference to FIGS. 6A to 6B.

Figure 6A:
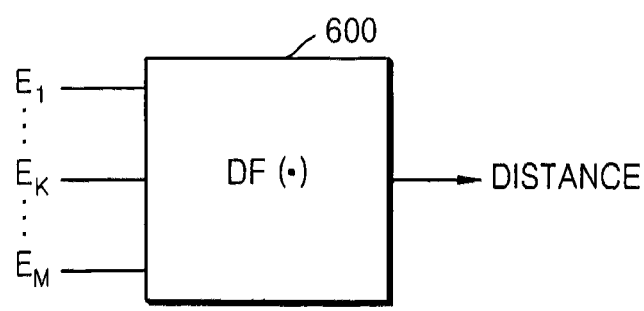
FIGS. 6A and 6B are diagrams for explaining a process of calculating a distance performed by a sound source signal filtering apparatus, according to embodiments of the present invention.
Figure 6B:
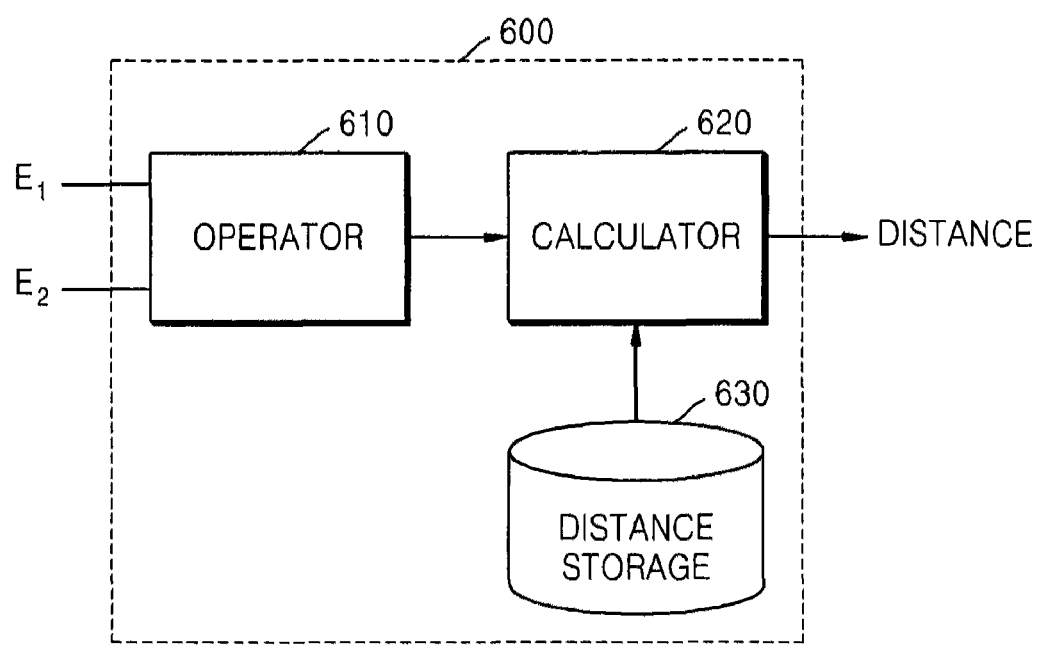

FIGS. 6A and 6B are diagrams for explaining the process of calculating a distance performed by a sound source signal filtering apparatus, according to embodiments of the present invention.

In FIG. 6A, a distance calculator 600 receives the microphone output signals $E_1, \ldots, E_K, \ldots, E_M$ to calculate through a distance function DF(•) thereon, and outputs a sound source distance. The distance function can implement the microphone output signals as a linear or nonlinear function or table, and more specifically, the distance function is a function satisfying the constraint conditions of independent magnitude of the sound source signal described above.

For convenience, it is assumed that the two microphone output signals are used and that the distance function DF(•) of the distance calculator 600 is a ratio between the two output signals. Here, when the microphone output signals are defined as $E_1$ and $E_2$ obtained by using Equations 2 and 4 described above, the distance function DF(•) may be defined as $E_1/E_2$ represented in Equation 5 as follows.

$$E_1 = A\sqrt{\left(\sum_{j=1}^{4} g(j)\frac{\cos\psi}{r(j)}\right)^2 + \left(\sum_{j=1}^{4} g(j)\frac{\sin\psi}{r(j)}\right)^2}$$ [Equation 5]

$$E_2 = A\sqrt{\left(\sum_{j=1}^{4} \frac{\cos\psi}{r(j)}\right)^2 + \left(\sum_{j=1}^{4} \frac{\sin\psi}{r(j)}\right)^2}$$

$$\frac{E_1}{E_2} = \frac{A\sqrt{\left(\sum_{j=1}^{4} g(j)\frac{\cos\psi}{r(j)}\right)^2 + \left(\sum_{j=1}^{4} g(j)\frac{\sin\psi}{r(j)}\right)^2}}{A\sqrt{\left(\sum_{j=1}^{4} \frac{\cos\psi}{r(j)}\right)^2 + \left(\sum_{j=1}^{4} \frac{\sin\psi}{r(j)}\right)^2}}$$

$$= \frac{\sqrt{\left(\sum_{j=1}^{4} g(j)\frac{\cos\psi}{r(j)}\right)^2 + \left(\sum_{j=1}^{4} g(j)\frac{\sin\psi}{r(j)}\right)^2}}{\sqrt{\left(\sum_{j=1}^{4} \frac{\cos\psi}{r(j)}\right)^2 + \left(\sum_{j=1}^{4} \frac{\sin\psi}{r(j)}\right)^2}}$$

where, $$\psi = \frac{2\pi \cdot r(j)}{\lambda}$$

$$= \frac{2\pi \cdot f \cdot r(j)}{c}$$

$$= \frac{2\pi \cdot f \cdot \sqrt{(x(j) - R\cdot\cos\theta)^2 + (y(j) - R\cdot\sin\theta)^2}}{c}$$

Here, A denotes an amplitude, θ denotes a direction, f denotes a frequency, c denotes a speed of sound in air, and R denotes a sound source distance. Therefore, the magnitude A (amplitude) of the sound source signal in Equation 5 is present both at a denominator and a numerator and therefore can be eliminated, so that the distance function $E_1/E_2$ can be a function independent from the magnitude of the sound source signal.

It can be noted that factors in Equation 5 for determining the distance function $E_1/E_2$ are the direction θ, the frequency f, and the distance R. Therefore, once $E_1/E_2$ is obtained through the use of the direction θ, the frequency f, and the distance function, the distance R can also be obtained. The distance calculator 600 computes the microphone output signals through the distance function DF(•), and therefore can calculate the sound source distance by using the positional (including direction and distance) relationships according to the results of calculation and frequencies of the sound source signals.

FIG. 6B illustrates a method of calculating a sound source distance by using a conversion table including results obtained in advance from the transformation function. The distance calculator 600 illustrated in FIG. 6B includes an operator 610, a calculator 620, and a distance storage 630. For the convenience of description, only the two microphone output signals $E_1$ and $E_2$ are used.

The operator 610 performs a computation by receiving the microphone output signals $E_1$ and $E_2$. As illustrated in FIG. 6A, when the distance function is defined as $E_1/E_2$, a result of the computation is output.

The distance storage unit 630 may store sound source distances in advance according to the computation results of the distance function $E_1/E_2$ in a form of a table or a database. For example, when a direction and a frequency of a sound source are specified, the stored table is searched by using the direction and the frequency, as well as the computation results of the distance function $E_1/E_2$, and a sound source distance corresponding to the search result can be retrieved. When the distance storage unit 630 is implemented as the database, search keys for searching for the sound source distance may be the direction and the frequency.

The calculator 620 inquires of the distance storage 630 what value is the sound source distance corresponding to the computation result of the distance function $E_1/E_2$ using the computation result of the operator 610 and other information (such as the direction and the frequency of a sound source) as parameters. As a result, the calculator 620 receives the sound source distance.

As illustrated in FIGS. 6A and 6B, it can be easily construed by the use of Equations described above, studies, or use of experimental results that the distance calculator 600 can calculate a sound source distance. Therefore, as long as a condition that the distance function of the distance calculator 600 does not relate to changes in the magnitude of the sound source signal is satisfied, the distance calculator may be designed to be appropriate for an environment in which the exemplary embodiments of the present invention are implemented.

The process of calculating the sound source distance performed by the distance calculator 130 illustrated in FIG. 1 is described above, according to the aforementioned embodiments. Next, the signal filter 140 of FIG. 1 will be described.

The signal filter 140 filters the sound source signals to obtain one or more sound source signals corresponding to particular distances on the basis of the distance calculated by the distance calculator 130. Here, the particular distance refers to a sound source distance from which a sound source emitting a sound source signal to be acquired by a user from among sound source signals input though the plurality of the microphones $111_1$ to $111_N$ is disposed. Since the sound source distances corresponding to sound sources are calculated by the distance calculator 130, when sound source signals are filtered by using the sound source distances, only a sound source signal emitted from a sound source from a particular distance can be obtained.

Figure 7A:
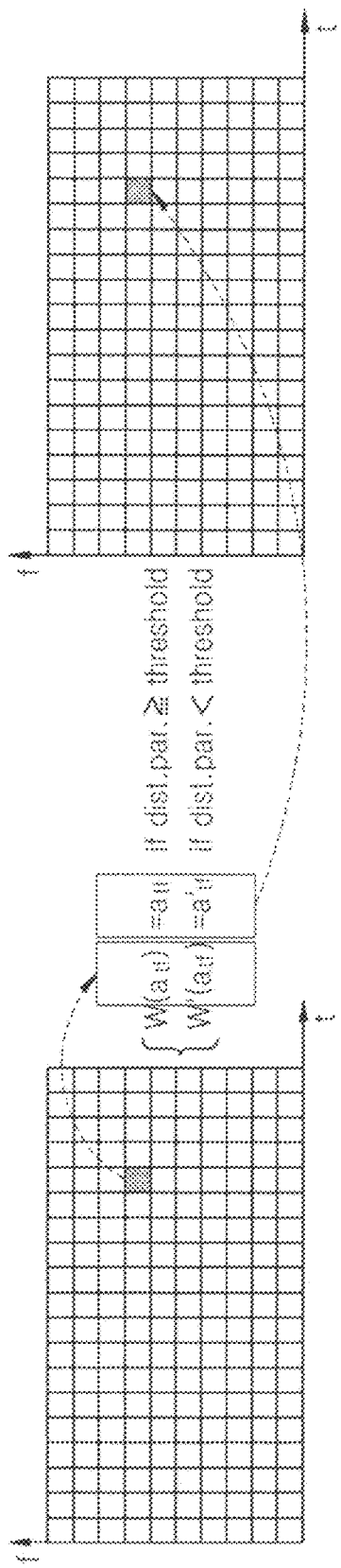
FIGS. 7A and 7B are diagrams for explaining a process of filtering sound source signals and an application method thereof performed by the sound source signal filtering apparatus, according to an embodiment of the present invention.
Figure 7B:
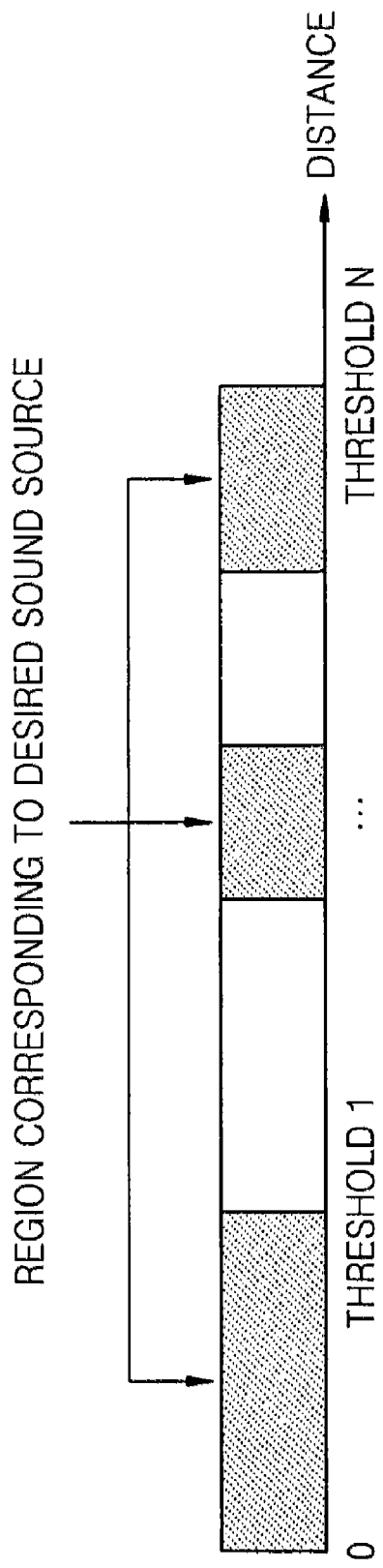

Now, a process of filtering the sound source signals performed by the signal filter 140 will be described in detail with reference to FIGS. 7A and 7B. FIGS. 7A and 7B are diagrams for explaining the process of filtering sound source signals and an application method thereof performed by the sound source signal filtering apparatus, according to an embodiment of the present invention. First, before explaining FIGS. 7A and 7B, the process of filtering sound source signals is described.

A detailed process of filtering sound source signals performed by a signal filter (not shown) is as follows. First, a weight of a sound source signal is calculated by comparing the distance calculated by the distance calculator (not shown) with a threshold value. Next, a sound source signal corresponding to a particular distance is obtained according to the calculated weight.

In FIG. 7A, a result of performing time-frequency transformation on a sound source signal is displayed on coordinates. The abscissa axis of the coordinates refers to time, and the ordinate axis refers to frequency. In general, for digital signal processing, a convolution is used to input a signal to a corresponding system and represent an output signal generated as a result of the input. In this case, in order to limit a given signal, the signal is divided into individual frames to be processed. Here, the frame refers to a unit obtained by dividing the sound source signal into predetermined sections according to changes in time. Specifically, the frame is an individual section obtained by dividing the time axis of the coordinates of FIG. 7A. An individual processing unit obtained by dividing the frequency axis into predetermined sections is called a bin.

In FIG. 7A, a time-frequency transformation result on the left represents a sound source signal before the filtering, and a time-frequency transformation result on the right represents a sound source signal after the filtering. As described above, for a single frequency bin, a sound source distance and a threshold value are compared with each other. The sound source distance may be processed as a particular parameter so as to be easily calculated and used for the comparison. Otherwise, the distance may be directly used for the comparison.

In addition, the threshold value may be determined according to an environment in which the exemplary embodiments of the present invention are implemented. Therefore, the threshold value may be a value that has been set to a predetermined value, or a value determined by the user. According to a range of distance areas for filtering the sound source signal, one or more threshold values may be used. For example, when a sound source signal having a sound source distance of 1 m~2 m and a sound source signal having a sound source distance of 5 m~7 m are to be simultaneously acquired, four threshold values may be set to perform the sound source distance comparison through the application of various equations.

FIG. 7B illustrates a method of displaying a sound source signal depending on distances and a method of selecting a region corresponding to a desired sound source. In FIG. 7A, the abscissa axis refers to distance, wherein various threshold values such as 1 to N can be set. Thus, only regions corresponding to the sound source desired by the user can be selected and acquired by comparing the sound source distances with the threshold values.

Returning to FIG. 7A, only two cases where the sound source distance is either larger or smaller than the threshold value are exemplified. Specifically, a filtering method of determining weights as predetermined two values (particularly, performing filtering by using two values 0 and 1) is referred to as a binary weighted filtering. However, it will be understood that a soft weighted filtering method and the like using a linear or nonlinear function in addition to the binary weighted filtering may be used in order to determine the weights. As one of the soft weighted filtering methods, a sigmoid function of transforming input values that are intermittent and nonlinear into continuous and linear values between 0 and 1 is well known.

The filter illustrated in FIG. 7A is reconfigured by using the aforementioned distance function $E_1/E_2$ as represented by Equation 6.

$$\begin{cases} W(a_{tf}) = a_{tf} \cdot 1 & \text{if } \frac{E_1(t,f)}{E_2(t,f)} \geq \text{threshold} \\ W'(a_{tf}) = a_{tf} \cdot 0 & \text{if } \frac{E_1(t,f)}{E_2(t,f)} < \text{threshold} \end{cases} \quad \text{[Equation 6]}$$

As represented in Equation 6, when a computation result of the distance function is equal to or larger than the threshold value, a weight is calculated by multiplying 1 to the computation result, and when the operation result is smaller than the threshold value, a weight is calculated by multiplying 0 to the computation result.

The operations performed by the signal filter 140 illustrated in FIG. 1 of obtaining one or more sound source signals corresponding to particular distances by filtering the sound source signals depending on the distances calculated by the distance calculator 130 are described above. According to an embodiment of the present invention, it is possible to obtain only sound source signals emitted from a sound source at a particular distance from the microphone array among a plurality of sound source signals input through the microphone array.

FIG. 2 is a block diagram illustrating a sound source signal filtering apparatus based on a sound source distance, according to an embodiment of the present invention. The sound source signal filtering apparatus according to the current embodiment further includes a direction calculator 250 in addition to the sound source signal filtering apparatus illustrated in FIG. 1. Similarly to FIG. 1, the sound source signal filtering apparatus illustrated in FIG. 2 also includes a plurality of microphones $211_1$ to $211_N$, a microphone output signal generator 220, a distance calculator 230, and a signal filter 240. A newly included direction calculator 250 will be described in detail below.

The direction calculator 250 calculates input directions of sound source signals by using time delays between the sound source signals input through the plurality of the microphones $211_1$ to $211_N$. In general, in order for the microphone array including two or more microphones to receive target signals mixed with background noises with high sensitivity, the microphone array provides an appropriate weight to each of the received signals to increase amplitudes. Accordingly, the microphone array functions as a filter for spatially reducing noise when directions of a desired target signal and an interference noise signal are different from each other. A type of spatial filter having the aforementioned function is called a beam-former.

In order to obtain sound source directions of sound source signals input from various sound sources around the microphones, phase differences between an array pattern and signals input to the microphones must be obtained. A number of beam-forming algorithms for obtaining the signal information are widely known. As a representative beam-forming algorithm for amplifying or extracting a target source signal, there is a delay-and-sum algorithm for obtaining a position of a sound source using relative delay times at which sound source signals are arrived at the microphones, or a filter-and-sum algorithm for spatially filtering outputs by using a linear filter to reduce influences from two or more signals and noise in a sound field formed by sound sources. The beam-forming algorithms are well known by those skilled in the art, and the delay-and-sum algorithm will be described to explain the direction calculator 250 according to embodiments of the present invention described below.

As described above, the direction calculator 250 searches for a sound source signal that has dominant signal characteristics such as high gain or high sound pressure from surroundings to calculate a sound source direction, thus the direction calculator 250 detects a direction or a position representing dominant signal characteristics regarding the sound sources in the surroundings. Here, for a method of perceiving the dominant signal characteristics, an objective measured value such as a signal to noise ratio (SNR) of a corresponding sound source signal can be used to determine a direction of a sound source having a relatively larger measured value as a target sound source direction.

For measurement methods, there are time delay of arrival (TDOA) method, beam-forming method, spectral analysis method, various sound source position searching methods, and the like. Now, the methods are briefly explained.

According to the TDOA method, time delays between microphones are measured by paring the microphones of an array regarding a mixed sound input to the plurality of the microphones 211 and 212 from a number of sound sources, and directions of the sound sources are estimated by using the measured time delays. Next, the direction calculator 250 assumed that a sound source exists at a spatial point where the sound source directions estimated by each pair cross. According to the beam-forming method, the direction calculator 250 provides a delay to a sound source signal at a predetermined angle, scans signals in a space based on angles, and selects a position having a largest scanned signal value as a target sound source direction, thereby estimating a position of the sound source. The various position searching methods can be easily construed so a detailed description thereof is omitted.

Figure 3A:
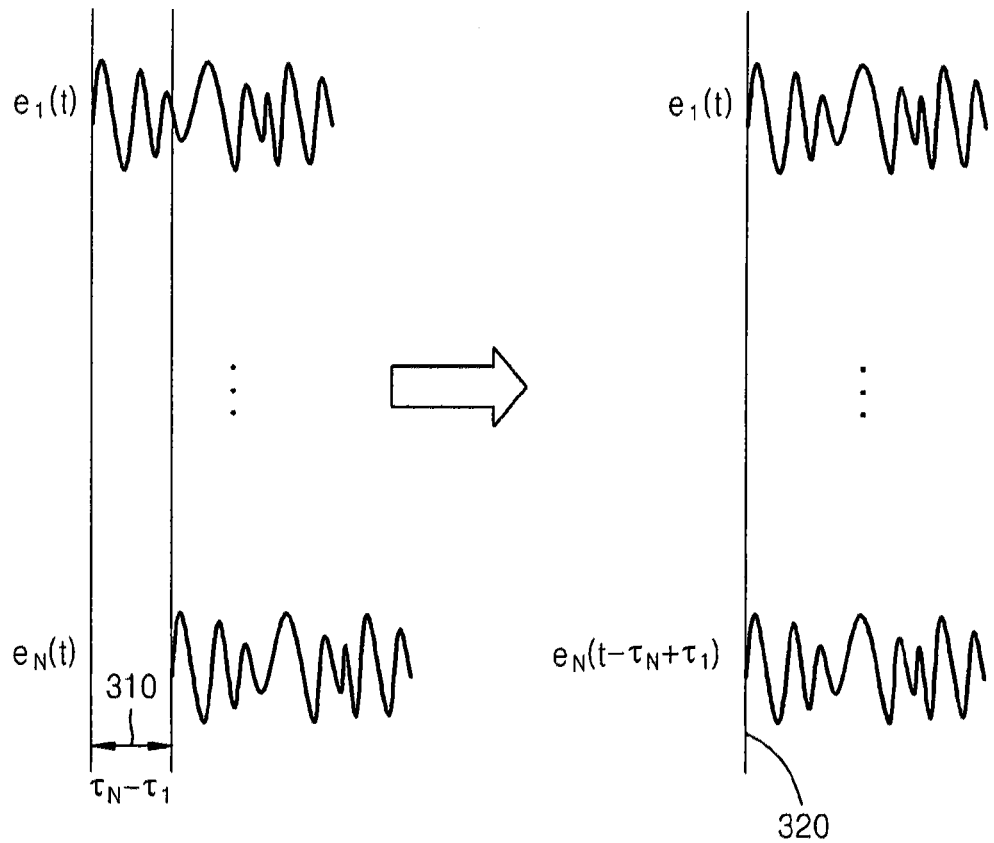
FIGS. 3A to 3C are diagrams for explaining a process of calculating a direction of a sound source performed by a sound source signal filtering apparatus, according to an embodiment of the present invention.
Figure 3B:
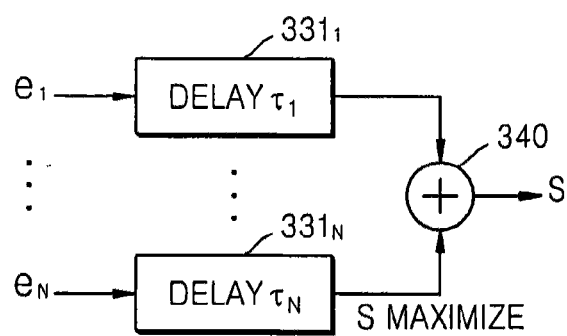
Figure 3C:
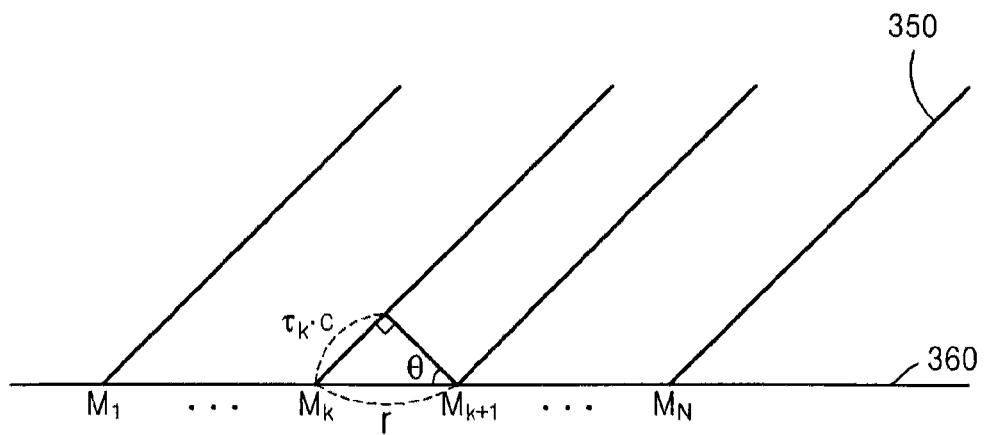

FIGS. 3A to 3C are views for explaining a process of calculating a direction of a sound source performed by the sound source signal filtering apparatus according to the embodiment of the present invention and illustrate the aforementioned direction calculating operations.

Sound waves illustrated in FIG. 3A represent sound source signals input through the microphones. Specifically, the sound waves on the left represent operations of searching for a direction of a sound source, and the sound waves on the right represent sound waves when the direction of the sound source is searched. First, the direction calculator (not shown) searches for a sound source signal while changing an angle of all surrounding directions. When the direction of the sound source and a direction the microphones are headed for are different from each other, distance differences between the microphones may generate a delay between arrival times of sound waves. In FIG. 3A, it can be seen that a time difference of $\tau_N - \tau_1$ 310 occurs between arrival times of a sound wave $e_1(t)$ and a sound wave $e_N(t)$. By controlling a delay value so that the time difference does not occur and the arrival times are the same as a reference value 320 on the right, phases and magnitudes of the sound waves are substantially the same, so that the sound source direction can be calculated by using the delay value.

FIG. 3B illustrates a configuration according to the delay-and-sum algorithm for controlling the delay value of FIG. 3A. In FIG. 3B, the sound source signals (referred to as arrived sound waves) $e_1$ to $e_N$ are delayed by a predetermined time through delay units $331_1$ to $331_N$, and the sound source signals are generated as an output signal S through an adder 340. Here, the delay units $331_1$ to $331_N$ control the delay value so that a magnitude of an output signal S is maximized. As described with reference to FIG. 3A, when the direction of the microphones and the direction of the sound source are aligned, the time delays of the sound source signals are the same, and the magnitudes of the sound source signals are substantially the same. When the sound source signals are added, the sound source signal may be amplified. Therefore, according to the current embodiment of the present invention, the delay units $331_1$ and $331_N$ control the delay values and calculate a delay value when the output signal S is maximized to calculate the sound source direction.

FIG. 3C illustrates a process of calculating the sound source direction using the delay value. In FIG. 3A, it is assumed that microphones $M_1, \ldots, M_k, M_{K+1}, \ldots, M_N$ are arrayed at a horizontal line 360. In addition, slanted lines represent directions in which sound source signals are incident from a sound source. When an interval between the microphones is denoted as r, Equation 7 is obtained.

$$\tau_k \cdot c = r \sin \theta \qquad [\text{Equation 7}]$$

Here, $\tau_K$ denotes a delay value, c denotes a speed of a sound wave in air, and θ denotes an angle (the sound source direction) between the microphones and the sound source. By arranging Equation 7, Equation 8 can be obtained.

$$\theta = \sin^{-1}\left(\frac{\tau_k \cdot c}{r}\right) \quad \text{[Equation 8]}$$

Specifically, Equation 8 infers that the sound source direction can be calculated through the use of the delay value measured in advance, the speed of the sound wave, and the interval between the microphones.

The process of calculating the sound source direction performed by the direction calculator 250 illustrated in FIG. 2 is described above. By using the calculated sound source direction and the microphone output signals generated by the microphone output signal generator 220, the distance calculator 230 calculates the sound source distance, and the signal filter 240 acquires a sound source signal corresponding to a particular distance. This is described above with reference to FIG. 1.

According to an embodiment of the present invention, it is possible to obtain only sound source signals emitted from a sound source at a particular distance from a microphone array among a plurality of sound source signals input through the microphone array. Particularly, sound source signals emitted from a sound source in the same direction as the microphone array can be clearly identified, so that even if a target sound source and a noise sound source are in the same direction, a target sound source signal and a noise signal can be clearly distinguished by using a sound source distance.

Figure 8:
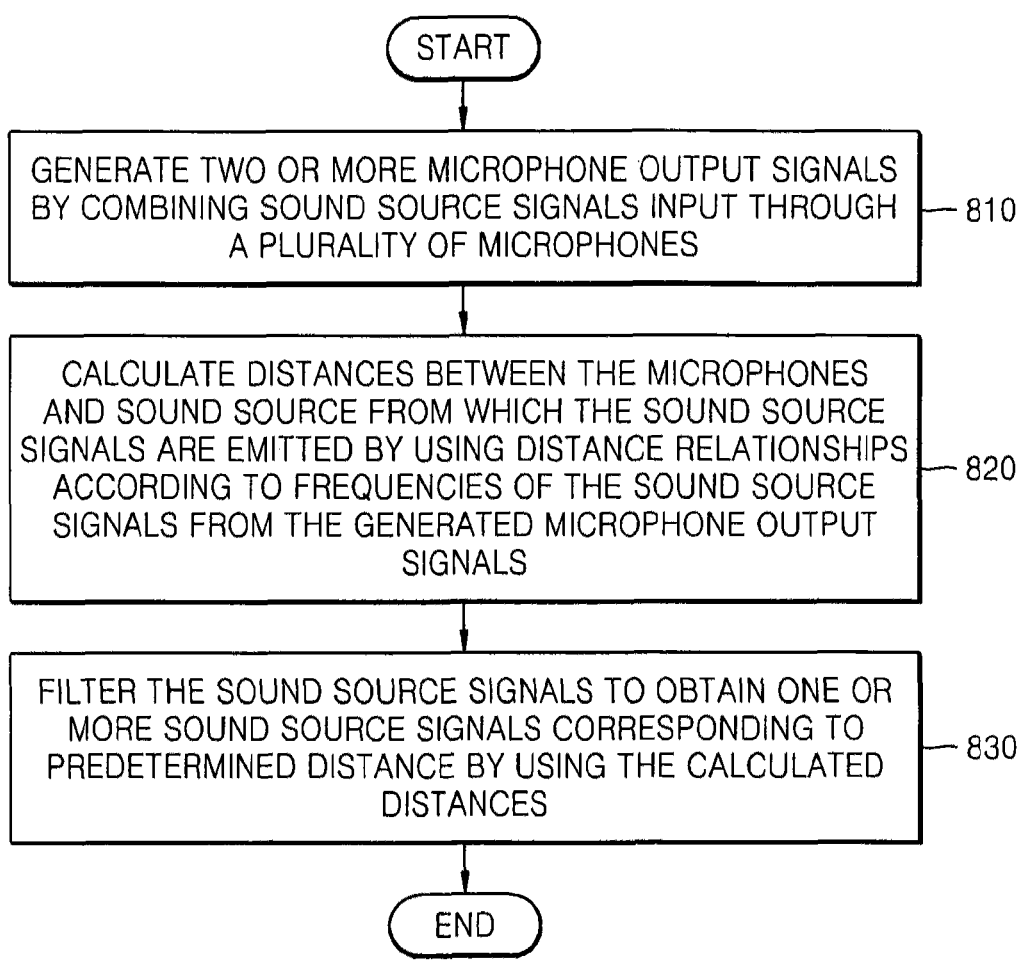
FIG. 8 is a flowchart of a sound source signal filtering method, according to another embodiment of the present invention.

FIG. 8 is a flowchart of a sound source signal filtering method based on a sound source distance, according to an embodiment of the present invention and includes a process as follows.

In operation 810, two or more microphone output signals are generated by combining sound source signals input through a plurality of microphones. The microphone output signals have different sound attenuation rates according to distances.

In operation 820, by using distance relationships according to frequencies of the sound source signals of the microphone output signals generated in operation 810, distances from the microphones to the sound source from which the sound source signals are emitted are calculated. This process performs the removal of magnitudes of the generated microphone output signals to generate result values independent from the magnitudes of the signals, and this process calculates the distance to the sound source by using the result values.

In operation 830, the sound source signals are filtered to obtain one or more sound source signals corresponding to a predetermined distance by using the distances calculated in operation 820. The process of filtering the sound source signals are performed by comparing the distance calculated in operation 820 with a predetermined threshold value to calculate weights of the sound source signals, and by obtaining the sound source signals corresponding to the predetermined distance based on the calculated weights. Here, the weight of the sound source signal may be a predetermined value or an output value obtained by inputting a result of the comparison of the distance computed in operation 820 with a predetermined threshold value to a linear or nonlinear function.

Accordingly, it is possible to obtain only sound source signals emitted from a sound source at a particular distance from the microphone array among a plurality of sound source signals input through the microphone array, according to another embodiment of the present invention.

An embodiment of the present invention can also be embodied as computer readable codes on a computer readable recording medium. The computer readable recording medium is a data storage device that can store data which can be read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network-coupled computer systems so that the computer readable code can be stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A sound source signal filtering method comprising:
    generating two or more microphone output sound signals by combining sound source signals input through a plurality of microphones;
    calculating distances between the microphones and a sound source from which the sound source signals are emitted by using distance relationships according to frequencies of the sound source signals extracted from the generated microphone output sound signals; and
    filtering the sound source signals to obtain one or more sound source signals corresponding to a predetermined distance by using the calculated distances.

2. The method of claim 1, further comprising generating result values independent from magnitudes of the generated microphone output sound signals by removing the magnitudes,
    wherein in calculating distances, a distance between the result value to the sound source is calculated.

3. The method of claim 1, wherein the microphone output sound signals have different sound attenuation rates from each other according to the calculated distances.

4. The method of claim 1, wherein the filtering of the sound source signals comprises:
    calculating weights of the sound source signals by comparing the calculated distances with predetermined threshold values; and
    filtering the sound source signals based on the calculated weights to obtain sound source signals corresponding to a predetermined distance.

5. The method of claim 4, wherein the weight is a predetermined value or an output value obtained by inputting a result of the comparison of the calculated distances with the predetermined threshold values to a linear or nonlinear function.

6. The method of claim 1, further comprising calculating input directions of the sound source signals by using arrival time differences from a sound source between the input sound source signals,
    wherein in calculating the distances, a distance to the sound source is calculated by using the calculated input direction.

* * * * *